United States Patent
Takeuchi et al.

(10) Patent No.: US 10,100,176 B2
(45) Date of Patent: *Oct. 16, 2018

(54) RESIN PARTICLE COMPOSITION

(71) Applicant: FUJI XEROX CO., LTD., Tokyo (JP)

(72) Inventors: Sakae Takeuchi, Kanagawa (JP); Hiroyoshi Okuno, Kanagawa (JP); Satoshi Inoue, Kanagawa (JP); Yoshifumi Iida, Kanagawa (JP); Yasuo Kadokura, Kanagawa (JP); Tomohito Nakajima, Kanagawa (JP); Takeshi Iwanaga, Kanagawa (JP); Shunsuke Nozaki, Tokyo (JP); Yuka Zenitani, Kanagawa (JP); Yoshifumi Eri, Kanagawa (JP); Yasuhisa Morooka, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 74 days.

This patent is subject to a terminal disclaimer.

(21) Appl. No.: 15/207,990

(22) Filed: Jul. 12, 2016

(65) Prior Publication Data

US 2017/0226326 A1 Aug. 10, 2017

(30) Foreign Application Priority Data

Feb. 10, 2016 (JP) .................................. 2016-024138

(51) Int. Cl.
- *C08K 9/06* (2006.01)
- *C08K 3/36* (2006.01)
- *C08K 9/08* (2006.01)
- *B29B 7/00* (2006.01)

(52) U.S. Cl.
CPC ................. *C08K 9/06* (2013.01); *C08K 3/36* (2013.01); *C08K 9/08* (2013.01); *B29B 7/005* (2013.01)

(58) Field of Classification Search
None
See application file for complete search history.

(56) References Cited

FOREIGN PATENT DOCUMENTS

JP 2013166667 A 8/2013

OTHER PUBLICATIONS

Jul. 4, 2018 Office Action issued in Chinese Application No. 201610807129.2.

*Primary Examiner* — Catherine S Branch
(74) *Attorney, Agent, or Firm* — Oliff PLC

(57) ABSTRACT

A resin particle composition includes resin particles, inorganic particles surface-treated with oil, and silica particles having a compression aggregation degree of 60% to 95% and a particle compression ratio of 0.20 to 0.40.

10 Claims, No Drawings

RESIN PARTICLE COMPOSITION

CROSS-REFERENCE TO RELATED APPLICATIONS

This application is based on and claims priority under 35 USC 119 from Japanese Patent Application No. 2016-024138, filed Feb. 10, 2016.

BACKGROUND

1. Technical Field

The present invention relates to a resin particle composition.

2. Related Art

A resin particle composition has been applied as various applications such as a binder.

Here, in the resin particle composition, for example, silica particles may be used together with resin particles in order to improve the strength and fluidity of resin particles and prevent the packing of resin particles. In particular, powder, such as resin particles, is often subjected to a transportation method (hereinafter, also referred to as "air transportation") in which powder is transported by air flowing in a pipe. In the application of this transportation method, the improvement in fluidity of resin particles is significant.

SUMMARY

According to an aspect of the invention, there is provided a resin particle composition, including:

resin particles;

inorganic particles surface-treated with oil; and silica particles having a compression aggregation degree of 60% to 95% and a particle compression ratio of 0.20 to 0.40.

DETAILED DESCRIPTION

Hereinafter, exemplary embodiments of the present invention will be described.

A resin particle composition, for example, includes inorganic particles surface-treated with oil (hereinafter, referred to as "oil-treated inorganic particles") together with resin particles, thereby imparting functionality, such as lubricity, to resin particles.

Resin Particle Composition

The resin particle composition according to the exemplary embodiment includes resin particles, oil-treated inorganic particles, and silica particles having a compression aggregation degree of 60% to 95% and a particle compression ratio of 0.20 to 0.40 (hereinafter, referred to as "specific silica particles").

The resin particle composition according to the exemplary embodiment has the above configuration, thereby preventing the fixation of the resin particle composition into the pipe in the case of transporting the resin particle composition using air. The reason for this is not clear, but it is considered to be due to the following reasons.

It is considered that, when the compression aggregation degree and particle compression ratio of the specific silica particles are within the above ranges, respectively, the following effects are exhibited.

First, the significance of setting the compression aggregation degree of the specific silica particles to 60% to 95% will be described.

The compression aggregation degree is an index indicating the aggregability of silica particles and the adhesiveness of silica particles to resin particles. This index is indicated by the degree of unraveling difficulty of a compact obtained by compressing silica particles when dropping the compact of silica particles.

Thus, as the compression aggregation degree increases, the aggregation force (intermolecular force) of silica particles tends to become stronger, and the adhesion force of silica particles to resin particles also Lends to be stronger. The details of the method of calculating the compression aggregation degree will be described later.

Therefore, the specific silica particles, the compression aggregation degree of which is highly controlled in a range of 60% to 95%, have good aggregability and good adhesiveness to resin particles. However, from the viewpoint of securing the fluidity of silica particles and the dispersibility of silica particles to resin particles while maintaining good aggregability of silica particles and good adhesiveness of silica particles to toner particles, the upper limit value of the compression aggregation degree is set to 95%.

Next, the significance of setting the particle compression ratio of the specific silica particles to 0.20 to 0.40 will be described.

The particle compression ratio is an index indicating the fluidity of silica particles. Specifically, the particle compression ratio is indicated by the ratio of difference between compressed apparent specific gravity and loose apparent specific gravity of silica particles to compressed apparent specific gravity of silica particles ((compressed apparent specific gravity—loose apparent specific gravity)/compressed apparent specific gravity).

Thus, as the particle compression ratio decreases, the fluidity of silica particles increases. Further, as the fluidity of silica particles increases, the dispersibility of silica particles to resin particles tends to become high. The details of the method of calculating the particle compression ratio will be described later.

Therefore, the specific silica particles, the particle compression ratio of which is lowly controlled in a range of 0.20 to 0.40, have good fluidity and good dispersibility to resin particles. However, from the viewpoint of improving the aggregability of silica particles and the adhesiveness of silica particles to resin particles while maintaining good fluidity of silica particles and good dispersibility of silica particles to resin particles, the lower limit value of the particle compression ratio is set to 0.20.

From the above, the specific silica particles are characterized in that they are easily fluidized, they are easily dispersed in resin particles, and they have high aggregation force and high adhesion force to resin particles. Accordingly, the specific silica particles, the compression aggregation degree and particle compression ratio of which satisfy the above range, are silica particles having properties of high fluidity, high dispersibility to resin particles, high aggregability, and high adhesiveness to resin particles.

Next, estimated effects at the time of using resin particles and oil-treated inorganic particles and further using specific silica particles will be described.

First, since the specific silica particles have high fluidity and high dispersibility to resin particles, they easily adhere to the surface of resin particles in an almost uniform state when they are mixed with resin particles.

Further, when resin particles and oil-treated inorganic particles are used and the specific silica particles are further used, the oil-treated inorganic particles (including oil liberated from the oil-treated inorganic particles) easily adhere to the resin particles together with the specific silica particles. Therefore, the dispersibility of the oil-treated inorganic particles to the resin particles easily increases, and thus the oil-treated inorganic particles easily adhere to the resin particles in an almost uniform state.

Meanwhile, since the specific silica particles adhered to the surface of the resin particles once have high adhesiveness to the resin particles, it is difficult to cause the movement on the resin particles and the liberation from the resin particles at a load attributable to the air flow occurring when transporting the resin particle composition using air.

Further, the oil-treated inorganic particles (including oil liberated from the oil-treated inorganic particles) adhered to the resin particles together with the specific silica particles are also easily immobilized on the resin particles by the oil on the surface thereof. Therefore, in the resin particle composition, it is difficult to change a structure in which the specific silica particles and the oil-treated inorganic particles adhere to the resin particles.

As a result, it is considered that the resin particle composition of the exemplary embodiment exhibits an increased lubrication function, thereby preventing the fixation of the resin particle composition into the pipe in the case of transporting the resin particle composition using air.

From the above, it is estimated that the specific silica particles are used together with the resin particles and the oil-treated inorganic particles, thereby preventing the fixation of the resin particle composition of the exemplary embodiment into the pipe in the case of transporting the resin particle composition using air.

The resin particle composition has also the following characteristics due to the aggregability and fluidity of the specific silica particles.

When the specific silica particles are further mixed with the resin particles and the oil-treated inorganic particles, the specific silica particles adhere to the resin particles, and thus the resin particle composition is difficult to scatter in the air. Further, since the specific silica particles adhere to the resin particles, the aggregation of the resin particle composition is easily relaxed and the reflow of the resin particle composition becomes easy by the airflow occurring when transporting the resin particle composition using air even in the case of occurrence of the aggregation of the resin particle composition.

In the resin particle composition according to the exemplary embodiment, it is preferable that the particle dispersion degree of the specific silica particles is 90% to 100%.

Here, the significance of setting the particle dispersion degree of the specific silica particles to 90% to 100% will be described.

The particle dispersion degree is an index indicating the dispersibility of silica particles. This index is indicated by the degree of easiness of dispersion of silica particles to resin particles in the primary particle state. Specifically, the particle dispersion degree is indicated by the ratio of actually-measured coverage C to calculated coverage $C_0$ (actually-measured coverage C/calculated coverage $C_0$) when the calculated coverage of resin particles with silica particles is represented by $C_0$ and the actually-measured coverage thereof is represented by C.

Therefore, as the particle dispersion degree increases, silica particles are difficult to aggregate, and are easy to be dispersed to the resin particles in the primary particle state. The details of the method of calculating the particle dispersion degree will be described later.

The dispersibility of the specific silica particles to the resin particles is further improved by controlling the particle dispersion degree to 90% to 100% at a high level while controlling the compression aggregation degree and the particle compression ratio within the above range. Thus, the oil-treated inorganic particles in the resin particle composition have higher dispersibility to the surface of the resin particles. As a result, the resin particle composition exhibits high lubrication function in the pipe, thereby easily preventing the fixation of the resin particle composition into the pipe in the case of transporting the resin particle composition using air.

In the resin particle composition according to the exemplary embodiment, as described above, as the specific silica particles, which have properties of high fluidity and high dispersibility to resin particles, high aggregability, and high adhesiveness to resin particles, silica particles, the surfaces of which are coated with a siloxane compound having a relatively large weight average molecular weight, are preferably exemplified. Specifically, silica particles, the surfaces of which are coated with a siloxane compound having a viscosity of 1,000 cSt to 50,000 cSt (preferably, the surface coated amount of the siloxane compound is 0.01% by weight to 5% by weight), are preferably exemplified. These specific silica particles are obtained by a surface treatment method in which the surfaces of silica particles are treated with a siloxane compound having a viscosity of 1,000 cSt to 50,000 cSt such that the surface coated amount is 0.01% by weight to 5% by weight.

Here, the surface coated amount is referred to as the rate of surface-treated silica particles to silica particles before the surface treatment (untreated silica particles). Hereinafter, the silica particles before the surface treatment (that is, untreated silica particles) are simply referred to as "silica particles".

The specific silica particles, the surfaces of which are treated with a siloxane compound having a viscosity of 1,000 cSt to 50,000 cSt such that the surface coated amount is 0.01% by weight to 5% by weight, have high aggregability and high adhesiveness to resin particles as well as high fluidity and high dispersibility to resin particles, and the compression aggregation degree and particle compression ratio thereof easily satisfy the above requirements. Further, in the case of transporting the resin particle composition using air, the fixation of the resin particle composition into the pipe is easily prevented. The reason for this is not clear, but it is considered to be due to the following reasons.

When the siloxane compound having relatively high viscosity within the above range adheres to the surface of silica particles in a small amount within the above range, the function derived from the properties of the siloxane compound on the surface of the silica particles is expressed. Although the mechanism is not clear, when the specific silica particles are fluidized, the releasing properties derived from the siloxane compound are easily expressed by adhering a small amount of the siloxane compound having relatively high viscosity to the surface thereof within the above range, or the adhesiveness between the silica particles is deteriorated by the reduction of the inter-particle force due to the steric hindrance of the siloxane compound. Thus, the fluidity of silica particles and the dispersibility of silica particles to resin particles increase.

Meanwhile, when the silica particles are compressed, the long molecular chains of the siloxane compound of the surface of the silica particles are entangled, so that the closest packing properties of the silica particles increase, and the aggregation force between the silica particles is intensified. Further, it is considered that the aggregation force of the silica particles due to the entanglement of the long molecular chains of this siloxane compound is released by fluidizing the silica particles. In addition to this, the adhesion force of the silica particles to resin particles is also increased by the long molecular chains of the siloxane compound of the surface of the silica particles.

From the above, in the specific silica particles, in which the siloxane compound having viscosity within the above range adheres to the surface of silica particles in a small amount within the above range, the compression aggregation degree and particle compression ratio thereof easily satisfy the above requirements, and the particle dispersion degree thereof also easily satisfy the above requirements.

Hereinafter, the configuration of the resin particle composition will be described.

First, the specific silica particles will be described.

Specific Silica Particles

The specific silica particles have a compression aggregation degree of 60% to 95% and a particle compression ratio of 0.20 to 0.40.

First, the characteristics of silica particles will be described in detail.

Compression Aggregation Degree

The compression aggregation degree of the specific silica particles, from the viewpoint of securing the fluidity of the specific silica particles and the dispersibility of the specific silica particles to resin particles while maintaining good aggregability of the specific silica particles and good adhesiveness of the specific silica particles to resin particles (particularly, from the viewpoint of preventing the fixation of the resin particle composition into the pipe when transporting the resin particle composition using air), is 60% to 95%, preferably 65% to 95%, and more preferably 70% to 95%.

The compression aggregation degree is calculated by the following method.

A disc-shaped mold having a diameter of 6 cm is filled with 6.0 g of the specific silica particles. Next, the mold is compressed for 60 seconds by a pressure of 5.0 t/cm$^2$ using a compression molding machine (manufactured by Maekawa Testing Machine MFG Co., Ltd.), so as to obtain a compressed disc-shaped compact of the specific silica particles (hereinafter, referred to as "compact before falling"). Thereafter, the weight of the compact before falling is measured.

Next, the compact before falling is placed on a sieve screen having a mesh opening of 600 μm, and is fallen by a vibration sieve machine (part number: VIBRATING MVB-1, manufactured by TSUTSUI SCIENTIFIC INSTRUMENTS CO., LTD.) under the conditions of amplitude of 1 mm and vibration time for 1 minute. Thus, the specific silica particles are fallen from the compact before falling through the sieve screen, and the compact of the specific silica particles remains on the sieve screen. Thereafter, the weight of the remaining compact of the specific silica particles (hereinafter, referred to as "compact after falling") is measured.

Then, the compression aggregation degree is calculated from the ratio of weight of compact after falling to weight of compact before falling, using Equation (1) below.

compression aggregation degree=(weight of compact after falling/weight of compact before falling)×100    Equation (1):

Particle Compression Ratio

The particle compression ratio of the specific silica particles, from the viewpoint of securing the aggregability of the specific silica particles and the dispersibility of the specific silica particles to resin particles while maintaining good fluidity of the specific silica particles and good adhesiveness of the specific silica particles into resin particles (particularly, from the viewpoint of preventing the fixation of the resin particle composition into the pipe when transporting the resin particle composition using air), is 0.20 to 0.40, preferably 0.24 to 0.38, and more preferably 0.28 to 0.36.

The particle compression ratio is calculated by the following method.

The compressed apparent specific gravity and loose apparent specific gravity of silica particles are measured using a powder tester (manufactured by Hosokawa Micron Corporation, part number PT-S type). Then, the particle compression ratio is calculated from the ratio of difference between compressed apparent specific gravity and loose apparent specific gravity of silica particles to compressed apparent specific gravity, using Equation (2) below.

particle compression ratio=(compressed apparent specific gravity−loose apparent specific gravity)/compressed apparent specific gravity    Equation (2):

Here, the "loose apparent specific gravity" is a measurement value derived by filling a container having a volume of 100 cm$^3$ with silica particles and weighing the container filled with the silica particles, and refers to filling specific gravity in a state of the specific silica particles being naturally fallen into the container. The "compressed apparent specific gravity" refers to apparent specific gravity of the specific silica particles which are degased, rearranged and more densely packed by repeatedly applying an impact to the bottom of the container (tapping the bottom of the container) at a stroke length of 18 mm and a tapping speed of 50 times/min 180 times from the state of loose apparent specific gravity.

Particle Dispersion Degree

The particle dispersion degree of the specific silica particles, from the viewpoint of further improving the dispersibility of the specific silica particles to resin particles (particularly, from the viewpoint of preventing the fixation of the resin particle composition into the pipe when transporting the resin particle composition using air), is preferably 90% to 100%, and more preferably 95% to 100%.

The particle dispersion degree refers to the ratio of actually-measured coverage C of resin particles with the specific silica particles to calculated coverage $C_0$, and is calculated using Equation (3) below.

particle dispersion degree=actually-measured coverage C/calculated coverage $C_0$    Equation (3):

Here, the calculated coverage $C_0$ of the surface of resin particles with the specific silica particles may be calculated using Equation (3-1) below, when the volume average particle diameter of resin particles is represented by dt (m), the average circle-equivalent diameter of the specific silica particles is represented by da (m), the specific gravity of resin particles is represented by ρt, the specific gravity of the specific silica particles is represented by ρa, the weight of resin particles is represented by Wt (kg), and the addition amount of the specific silica particles is represented by Wa (kg).

calculated coverage $C_0=\sqrt{3}/(2\pi)\times(\rho t/\rho a)\times(dt/da)\times(Wa/Wt)\times100(\%)$    Equation (3-1):

The actually-measured coverage C of the surface of resin particles with the specific silica particles may be calculated using Equation (3-2) below, after the signal intensities of silicon atoms derived from the specific silica particles are measured with respect to only the resin particles, only the specific silica particles, and the resin particles including the specific silica particles, respectively, by an X-ray photoelectron spectroscopy (XPS) ("JPS-9000MX", manufactured by JEOL Ltd.).

$$\text{actually-measured coverage } C=(z-x)/(y-x)\times 100(\%) \quad \text{Equation (3-2):}$$

In Equation (3-2), x represents signal intensity of silicon atoms derived from the specific silica particles with respect to only the resin particles. y represents signal intensity of silicon atoms derived from the specific silica particles with respect to only the specific silica particles. z represents signal intensity of silicon atoms derived from the specific silica particles with respect to the resin particles coated (covered) with the specific silica particles.)

Average Circle-Equivalent Diameter

The average circle-equivalent diameter of the specific silica particles, from the viewpoint of improving fluidity, dispersibility to resin particles, aggregability, and adhesiveness to resin particles (particularly, from the viewpoint of preventing the fixation of the resin particle composition into the pipe when transporting the resin particle composition using air), is preferably 40 nm to 200 nm, more preferably 50 nm to 180 nm, and further more preferably 60 nm to 160 nm.

The average circle-equivalent diameter D50 of the specific silica particles are obtained as follows. Primary particles after dispersing the specific silica particles into resin particles are observed by a scanning electron microscope (SEM) (S-4100, manufactured by Hitachi, Ltd.) to capture an image, this image is put into an image analyzer (LUZEX III, manufactured by Nireco Corporation), the area of each particle is measured by the image analysis of the primary particles, and the circle-equivalent diameter of the particle is calculated from this area value. The diameter corresponding to 50% in the cumulative frequency in terms of volume basis of the obtained circle-equivalent diameter is set to the average circle-equivalent diameter D50 of the specific silica particles. In addition, the magnification of the electron microscope is adjusted such that 10 to 50 specific silica particles appear in one field of view, and the circle-equivalent diameter of the primary particle is obtained in combination with observations in multiple fields of view.

Average Circularity Degree

Although the shape of the specific silica particles may be any of a spherical shape and different shapes, the average circularity degree of the specific silica particles, from the viewpoint of improving fluidity, dispersibility to resin particles, aggregability, and adhesiveness to resin particles in the specific silica particles (particularly, from the viewpoint of preventing the fixation of the resin particle composition into the pipe when transporting the resin particle composition using air), is preferably 0.85 to 0.98, more preferably 0.90 to 0.98, and further more preferably 0.93 to 0.98.

The average circularity degree of the specific silica particles is measured by the following method.

First, the circularity degree of the specific silica particles is obtained as "100/SF2" calculated by the following equation, from the analysis of the planar image obtained by observing the primary particles after adhering silica particles to the surface of resin particles by SEM.

$$\text{circularity degree } (100/SF2)=4\pi\times(A/I^2) \quad \text{Equation:}$$

(In the equation, I represents a boundary length of primary particles in an image, and A represents a projected area of primary particles.)

Further, the average circularity degree of the specific silica particles is obtained as 50% circularity degree in the cumulative frequency of circularity degree of 100 primary particles obtained by the above planar image analysis.

Here, a method of measuring the characteristics (compression aggregation degree, particle compression ratio, particle dispersion degree, and average circularity degree) of the specific silica particles in the resin particle composition will be described.

First, specific silica particles and oil-treated inorganic particles are separated from the resin particle composition as follows. The resin particle composition is dispersed in methanol, stirred, and then ultrasonically treated with an ultrasonic bath, so as to separate the specific silica particles and oil-treated inorganic particles from the resin particle composition. The easiness of the separation of the specific silica particles and oil-treated inorganic particles is determined by the particle diameter and specific gravity of the specific silica particles and oil-treated inorganic particles. Since the specific silica particles having a large diameter are easy to separate, only the specific silica particles are separated by setting the ultrasonic treatment condition to a weak condition.

Next, the ultrasonic treatment conditions are changed to a strong condition, and the oil-treated inorganic particles are separated from the surface of resin particles. The resin particles are precipitated by centrifugation to collect only the methanol dispersed with the specific silica particles or the oil-treated inorganic particles, and then this methanol is volatilized, so as to take out the specific silica particles or the oil-treated inorganic particles. In this ultrasonic treatment condition, a separation condition is adjusted by the specific silica particles and the oil-treated inorganic particles.

Then, the above characteristics are measured using the separated specific silica particles.

Next, the configuration of the specific silica particles will be described.

Silica Particles

The specific silica particles, which are particles containing silica (that is, $SiO_2$) as a main component, may be crystalline particles or amorphous particles. The specific silica particles may be particles prepared using a silicon compound, such as water glass or alkoxysilane, as a raw material, and may also be particles obtained by pulverizing quartz.

Examples of the specific silica particles include silica particles fabricated by a sol-gel process (hereinafter, referred to as "sol-gel silica particles"), aqueous colloidal silica particles, alcoholic silica particles, fumed silica particles obtained by a gas-phase process, and molten silica particles. Among these silica particles, sol-gel silica particles are preferable.

Surface Treatment

It is preferable that the specific silica particles are surface-treated with a siloxane compound in order to allow the compression aggregation degree, particle compression ratio and particle dispersion degree thereof to be within the above specific range.

As the surface treatment method, it is preferable to perform the surface treatment to the surface of silica particles in supercritical carbon dioxide using the supercritical carbon dioxide. The surface treatment method will be described later.

Siloxane Compound

The siloxane compound is not particularly limited as long as it has a siloxane skeleton in a molecular structure.

Examples of the siloxane compound include silicone oil and silicone resin. Among these, silicone oil is preferable, from the viewpoint of surface-treating the surface of silica particles in an almost uniform state.

Examples of silicone oil include dimethyl silicone oil, methyl hydrogen silicone oil, methylphenyl silicone oil, amino-modified silicone oil, epoxy-modified silicone oil, carboxyl-modified silicone oil, carbinol-modified silicone oil, methacryl-modified silicone oil, mercapto-modified silicone oil, phenol-modified silicone oil, polyether-modified silicone oil, methylstyryl-modified silicone oil, alkyl-modified silicone oil, higher fatty acid ester-modified silicone oil, higher fatty acid amide-modified silicone oil, and fluorine-modified silicone oil. Among these, dimethyl silicone oil, methyl hydrogen silicone oil, and amino-modified silicone oil are preferable.

The above siloxane compound may be used alone or in combination of two or more.

Viscosity

The viscosity (kinetic viscosity) of the siloxane compound, from the viewpoint of improving fluidity, dispersibility to resin particles, aggregability and adhesiveness to resin particles in the specific silica particles (particularly, from the viewpoint of preventing the fixation of the resin particle composition into the pipe when transporting the resin particle composition using air), is preferably 1,000 cSt to 50,000 cSt, more preferably 2,000 cSt to 30,000 cSt, and further more preferably 3,000 cSt to 10,000 cSt.

The viscosity of the siloxane compound is obtained by the following procedure. Toluene is added to the specific silica particles, and then the specific silica particles are dispersed in the toluene for 30 minutes by an ultrasonic dispersing machine. Thereafter, supernatant is collected. At this time, a toluene solution containing a siloxane compound in a concentration of 1 g/100 ml is obtained. The specific viscosity [ηsp] (25° C.) at this time is obtained by Equation (A) below.

$$\eta sp=(\eta/\eta 0)-1 \quad \text{Equation (A):}$$

(η0: viscosity of toluene, η: viscosity of solution)

Next, the specific viscosity [ηsp] is substituted into the Huggins Equation represented by Equation (B) below, so as to obtain intrinsic viscosity [η].

$$\eta sp=[\eta]+K'[\eta]^2 \quad \text{Equation (B):}$$

(K': Huggins's constant, K'=0.3 ([η]=1 to 3))

Next, the intrinsic viscosity [η] is substituted into the A. Kolorlov Equation represented by Equation (C) below, so as to obtain molecular weight M.

$$[\eta]=0.215 \times 10^{-4} M^{0.65} \quad \text{Equation (C):}$$

Next, the molecular weight M is substituted into the A. J. Barry Equation represented by Equation (D) below, so as to obtain siloxane viscosity [η₁].

$$\log \eta = 1.00 + 0.0123 M^{0.5} \quad \text{Equation (D):}$$

Surface Coated Amount

The amount of the siloxane compound adhered to the surface of the specific silica particles, from the viewpoint of improving fluidity, dispersibility to resin particles, aggregability, and adhesiveness to resin particles in the specific silica particles (particularly, from the viewpoint of preventing the fixation of the resin particle composition into the pipe when transporting the resin particle composition using air), is preferably 0.01% by weight to 5% by weight, more preferably 0.05% by weight to 3% by weight, and further more preferably 0.10% by weight to 2% by weight with respect to silica particles (silica particles before surface treatment).

The surface coated amount is measured by the following method.

100 mg of the specific silica particles are dispersed in 1 mL of chloroform, and 1 μL of DMF (N,N-dimethylformamide), as an internal standard solution, is added thereto, followed by ultrasonic treatment for 30 minutes with an ultrasonic cleaning machine, so as to extract a siloxane compound into the chloroform solvent. Thereafter, hydrogen nucleus spectrum measurement is performed by a JNM-AL400 type nuclear magnetic resonance apparatus (manufactured by JEOL Ltd.), and the amount of the siloxane compound is obtained from the ratio of a siloxane compound-derived peak area to a DMF-derived peak area. Then, the surface coated amount is calculated from the obtained amount of the siloxane compound and the amount of silica particles, from which the siloxane compound is liberated, (silica particles, to the surface of which the siloxane compound is not adhered).

The viscosity of the siloxane compound of the specific silica particles and surface coated amount are measured by separating the specific silica particles and the oil-treated inorganic particles from the resin particle composition using the above-described method.

Here, the specific silica particles are surface-treated with a siloxane compound having a viscosity of 1,000 cSt to 50,000 cSt, and the surface coated amount of the siloxane compound to the surface of silica particles is preferably 0.01% by weight to 5% by weight.

When the above requirements are satisfied, the specific silica particles having good fluidity and good dispersibility to resin particles and having improved aggregability and adhesiveness to resin particles are easily obtained.

Resin Particles

Next, the resin particles will be described.

The resin particles are not particularly limited as long as they have a shape, diameter, and material (component) required for adhering the specific silica particles to the resin particles. The resin particles may be determined depending on the application purpose of the resin particle composition according to the exemplary embodiment.

The shape of the resin particles is not particularly limited, but the volume average particle diameter of the resin particles is preferably 1 μm to 20 μm, more preferably 2 μm to 15 μm, and further more preferably 3 μm to 10 μm. When the volume average particle diameter of the resin particles is within the above range, the deterioration of fluidity of the resin particle composition is easily prevented.

Here, the volume average particle diameter of the resin particles is measured using COULTER MULTISIZER II (manufactured by Beckman Coulter, Inc.). In this measurement, ISOTON-II (manufactured by Beckman Coulter, Inc.) is used for measuring an electrolyte.

In the measurement, 0.5 mg to 50 mg of a measurement sample is added to 2 ml of an aqueous solution containing 5% by weight of a surfactant, such as sodium alkylbenzene sulfonate, as a dispersant. This resultant is added to 100 ml to 150 ml of an electrolyte.

The electrolyte in which the sample has been suspended is dispersion-treated for 1 minute with an ultrasonic dispersing machine, and the particle size distribution of particles within a range of 2 μm to 50 μm is measured using an aperture having a diameter of 100 μm by COULTER MULTISIZER II. The number of particles to be sampled is 50,000.

The volume average particle diameter $D_{50v}$ is defined by the particle diameter at 50% cumulative volume when drawing the cumulative distribution of the measured particle size distributions with respect to the divided particles size ranges (channels) from small diameter for volume. Specifically, the volume average particle diameter $D_{50v}$ is obtained as follows. The volume average particle diameter $D_{50v}$ at 50% cumulative volume is obtained by drawing a cumulative distribution using the volume distribution obtained by image analysis.

The resin constituting the resin particles is not particularly limited. As the resin constituting the resin particles, thermoplastic resins made of various natural or synthetic polymer materials may be used.

Examples of the resin include polyolefin resins, such as polyethylene and polypropylene; polystyrene resins, such as polystyrene and an acrylonitrile/butadiene/styrene copolymer (ABS resin); acrylic resins, such as polymethyl methacrylate and polybutyl acrylate; rubbery (co)polymers, such as polybutadiene and polyisoprene; polyester resins, such as polyethylene terephthalate and polybutylene terephthalate; vinyl resins, such as vinyl chloride resin, vinyl aromatic resin, and polyvinyl resin; epoxy resins; conjugated diene resins; polyamide resins; polyacetal resins; polycarbonate resins; thermoplastic polyurethane resins; and fluorine resins.

These resins may be used alone or as a mixture of two or more thereof.

As the resin constituting the resin particles, typically, resins having a weight average molecular weight of 5,000 to 100,000 (for example, epoxy resins, styrene-acrylate resins, polyamide resins, polyester resins, polyvinyl resins, polyolefin resins, polyurethane resins, and polybutadiene resins) are exemplified. These resins may be used alone or as a mixture of two or more thereof.

The resin particles may further contain an additive, such as an ultraviolet absorber or an antioxidant, depending on the intended use.

Oil-Treated Inorganic Particles

Next, the oil-treated inorganic particles will be described. The oil-treated inorganic particles are obtained by treating the surface of inorganic particles with oil. That is, the oil-treated inorganic particles are inorganic particles obtained by adhering oil to the surface of untreated inorganic particles.

Inorganic Particles

The inorganic particles for surface treatment with oil are not particularly limited. Examples thereof include particles of silica ($SiO_2$), titania ($TiO_2$), alumina ($Al_2O_3$), CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)n$, $Al_2O_3 \cdot 2SiO_2$, $CaCO_3$, $MgCO_3$, $BaSO_4$, and $MgSO_4$. In terms of improving a lubricity imparting effect, inorganic particles having small absolute specific gravity (for example, 1.1 to 2.5, and preferably 1.1 to 2.3) are preferable. In this respect, among the above inorganic particles, silica ($SiO_2$) particles are preferable.

In the case where silica particles are used as the above inorganic particles, the silica particles may be crystalline particles or amorphous particles. Further, the silica particles may be particles prepared using a silicon compound, such as water glass or alkoxysilane, as a raw material, and may also be particles obtained by pulverizing quartz.

Specific examples of the silica particles include silica particles fabricated by sol-gel silica particles, aqueous colloidal silica particles, alcoholic silica particles, fumed silica particles obtained by a gas-phase process, and molten silica particles.

Oil

As the oil for surface-treating the inorganic particles, oils generally used as lubricating oils or fats are exemplified. Specific examples thereof include lubricating oils, such as mineral oil and synthetic oil; and fats, such as plant oil and animal oil. These oils may be used alone or as a mixture of two or more thereof.

Specific examples of mineral oil include petroleum oils, such as silicone oil, naphtha, gas oil, kerosene, and heavy oil; and paraffin, liquid paraffin, ceresin, amber oil, and creosote oil.

Specific examples of synthetic oil include polybutene, alkylbenzene, alkylnaphthalene, and synthetic naphthene oil.

Specific examples of plant oil include castor oil, wood oil, linseed oil, shortening, corn oil, soybean oil, sesame oil, rapeseed oil, sunflower oil, rice oil, camellia oil, coconut oil, palm oil, walnut oil, olive oil, peanut oil, almond oil, jojoba oil, cocoa butter, rhea butter, neem oil, safflower oil, vegetable wax, candelilla wax, and carnauba wax.

Specific examples of animal oil include lard, beef fat, fish oil, horse oil, lanolin, butter, squalane, and beeswax.

Plant oil or animal oil contains the following fatty acids. However, as oil, these fatty acids may be used alone, and esters of fatty acids and glycerin, higher alcohol or lower alcohol may also be used. Examples of the fatty acids include saturated fatty acids, such as butyric acid, caproic acid, caprylic acid, capric acid, lauric acid, myristic acid, palmitic acid, stearic acid, arachidic acid, behenic acid, lignoceric acid, and cerotic acid; and unsaturated fatty acids, such as myristoleic acid, palmitoleic acid, oleic acid, elaidic acid, cis-vaccenic acid, vaccenic acid, erucic acid, linoleic acid, linolenic acid, arachidonic acid, eicosapentaenoic acid, and docosahexaenoic acid.

Among these oils, silicone oil is preferable. When silicone oil is applied, silica particles having high hydrophobicity are obtained, and the fluidity of the resin particle composition is easily improved.

Specific examples of the silicone oil include dimethyl silicone oil, methylphenyl silicone oil, chlorophenyl silicone oil, methyl hydrogen silicone oil, alkyl-modified silicone oil, fluorine-modified silicone oil, polyether-modified silicone oil, alcohol-modified silicone oil, amino-modified silicone oil, epoxy-modified silicone oil, epoxy.polyether-modified silicone oil, phenol-modified silicone oil, carboxyl-modified silicone oil, mercapto-modified silicone oil, acryl-modified silicone oil, methacryl-modified silicone oil, and methyl-styryl-modified silicone oil.

The viscosity of the oil may be, for example, 1 cSt or more and less than 1,000 cSt, preferably 10 cSt to 500 cSt, and more preferably 50 cSt to 300 cSt each at 25° C.

When the viscosity of this oil is within the above range, the lubricity imparting effect to the resin particle composition is exhibited, and it is easy to prevent the formation of coarse aggregates of the oil-treated inorganic particles.

The amount of the oil to be used is not particularly limited, but, for example, may be 3% by weight to 20% by weight, preferably 5% by weight to 15% by weight, and more preferably 7% by weight to 12% by weight, with respect to the inorganic particles.

The oil may be used alone, but may be used as a mixed solution in which the oil is mixed with a solvent easily dissolving the oil. Examples of the solvent include toluene, methyl ethyl ketone, and methyl isobutyl ketone.

The oil treatment may be performed in supercritical carbon dioxide, and may also be performed in the air.

In the case where the oil treatment is performed in supercritical carbon dioxide, for example, the oil treatment may be performed by the method having the following processes. First, a silica particle dispersion containing silica particles and a solvent including alcohol and water is prepared by a sol-gel process. Next, the supercritical carbon dioxide passes through the silica particle dispersion to remove the solvent from the silica particle dispersion. Thereafter, the surface of the silica particles after removing the solvent in the supercritical carbon dioxide is surface-treated with oil.

The amount of free oil in the oil-treated inorganic particles, from the viewpoint of imparting lubricity, is preferably 1% by weight to 10% by weight, more preferably 3% by weight to 10% by weight, and further more preferably 3% by weight to 5% by weight.

The free oil amount of the oil-treated inorganic particles is a value measured by the following method.

The proton NMR measurement of the oil-treated inorganic particles is performed using AL-400 (Magnetic field 9.4 T (H nuclear 400 MHz)) manufactured by JEOL Ltd. A zirconia sample tube (diameter: 5 mm) is filled with a sample, a heavy chloroform solvent, and TMS (reference material). The measurement is performed by setting this sample tube under the conditions of frequency: $\Delta 87$ kHz/400 MHz ($=\Delta 20$ ppm), measurement temperature: 25° C., the number of times of accumulation: 16 times, resolution 0.24 Hz (32,000 points), and the amount of free oil is calculated from free oil-derived peak intensity using a calibration curve.

For example, in the case where dimethyl silicone oil is used as the oil, the NMR measurement of untreated inorganic particles and dimethyl silicone oil (the amount of about five level is used) is performed to create a calibration curve of the free oil amount and the NMR peak intensity. Then, the free oil amount of is calculated using the calibration curve.

In order to increase the free oil amount of the oil-treated inorganic particles, for example, oil treatment is performed over several times. Further, in order to decrease the free oil amount of the oil-treated inorganic particles, for example, processes of dipping the inorganic particles in the solvent and then drying the inorganic particles are repeatedly carried out.

The average circle-equivalent diameter of the oil-treated inorganic particles, from the viewpoint of imparting lubricity to the resin particle composition, is preferably 30 nm to 200 nm, more preferably 30 nm to 180 nm, and further more preferably 30 nm to 150 nm. Meanwhile, it is preferable that the average circle-equivalent diameter of the specific silica particles is larger than that of the oil-treated inorganic particles.

The average circle-equivalent diameter of the oil-treated inorganic particles is a value measured by the following method.

The oil-treated inorganic particles are separated from the resin particle composition, and the average circle-equivalent diameter of the oil-treated inorganic particles is measured in the same manner as the above-described measurement method of the circle-equivalent diameter of the specific silica particles.

The method of separating the specific silica particles and the oil-treated inorganic particles from the resin particle composition is as described above. That is, first, only the specific silica particles are separated from the resin particle composition in the manner that the resin particle composition is dispersed in methanol, stirred, and then ultrasonically treated with an ultrasonic bath by setting the ultrasonic treatment condition to a weak condition. Next, the ultrasonic treatment condition is changed into a strong condition, and the oil-treated inorganic particles are separated from the surface of resin particles. Toner is precipitated by centrifugation to collect only the methanol dispersed with the specific silica particles or the oil-treated inorganic particles, and then this methanol is volatilized, thereby obtaining the oil-treated inorganic particles.

Then, the above characteristics are measured using the separated oil-treated inorganic particles.

Configuration of Resin Particle Composition

It is preferable that the content of specific silica particles in the resin particle composition and the content of oil-treated inorganic particles in the resin particle composition, from the viewpoint of preventing the fixation of the resin particle composition into the pipe when transporting the resin particle composition using air, are within the following ranges, respectively.

The content of specific silica particles is preferably 0.1 parts by weight to 6 parts by weight, more preferably 0.3 parts by weight to 4 parts by weight, and further more preferably 0.5 parts by weight to 2.5 parts by weight, with respect to 100 parts by weight of resin particles.

The content of oil-treated inorganic particles is preferably 0.1 parts by weight to 6 parts by weight, more preferably 0.3 parts by weight to 4 parts by weight, and further more preferably 0.5 parts by weight to 2.5 parts by weight, with respect to 100 parts by weight of resin particles.

Method of Preparing Resin Particle Composition

The resin particle composition according to the exemplary embodiment, for example, is prepared by the following method.

The resin particle composition according to the exemplary embodiment is obtained by a preparation method, the method including: a process of providing specific silica particles, oil-treated inorganic particles, and resin particles (hereinafter, referred to as a "particle providing process"); and a process of mixing the specific silica particles, oil-treated inorganic particles and resin particles prepared in the particle providing process (hereinafter, referred to as a "particle mixing process").

Particle Providing Process

First, in the particle providing process, specific silica particles, oil-treated inorganic particles, and resin particles, which are to be contained in the resin particle composition according to the exemplary embodiment, are provided.

Here, as the specific silica particles, commercially available silica particles satisfying the above-described compression aggregation degree and particle compression ratio may be provided, and silica particles prepared so as to satisfy the above-described compression aggregation degree and particle compression ratio may also be provided. In the case where the silica particles prepared in this way are provided as the specific silica particles, this preparation method is not particularly limited, but, for example, the resin particle composition may be prepared by processes to be described below.

Further, as the oil-treated inorganic particles and the resin particles, commercially available products may be provided, and the particles prepared in this way may also be provided.

Preparation of Specific Silica Particles

The specific silica particles are obtained by surface-treating the surface of silica particles with a siloxane compound having a viscosity of 1,000 cSt to 50,000 cSt such that the surface coated amount to the silica particles is 0.01% by weight to 5% by weight.

According to the silica particle providing process, silica particles having good fluidity and dispersibility to resin particles and having improved aggregability and adhesiveness to resin particles are obtained.

As the surface treatment method, a method of surface-treating the surface of silica particles with a siloxane compound in supercritical carbon dioxide and a method of surface-treating the surface of silica particles with a siloxane compound in the air are exemplified.

Specific examples of the surface treatment method include: a method of adhering a siloxane compound to the surface of silica particles using supercritical carbon dioxide by dissolving the siloxane compound in supercritical carbon dioxide; a method of adhering a siloxane compound to the surface of silica particles by applying (for example, spraying or coating) a solution including a siloxane compound and a solvent dissolving the siloxane compound to the surface of silica particles in the air; and a method of adding a solution including a siloxane compound and a solvent dissolving the siloxane compound to a silica particle dispersion and then drying a mixed solution of the silica particle dispersion and the solution.

Here, the "supercritical carbon dioxide" is carbon dioxide existing in the state of temperature and pressure equal to or more than the critical point, and has both diffusivity of gas and solubility of liquid.

Among these surface treatment methods, a method of adhering a siloxane compound to the surface of silica particles using supercritical carbon dioxide is preferable.

When the surface treatment is performed in supercritical carbon dioxide, there becomes a state in which the siloxane compound is dissolved in the supercritical carbon dioxide. Since the supercritical carbon dioxide has low interfacial tension, it is considered that the siloxane compound existing in the state of being dissolved in the supercritical carbon dioxide diffuses deeply into the holes of the surface of silica particles together with supercritical carbon dioxide to easily reach the hole, and it is considered that the surface treatment with the siloxane compound is performed deeply in the hole as well as on the surface of silica particles.

Therefore, it is considered that the silica particles surface-treated with the siloxane compound in the supercritical carbon dioxide are silica particles treated in a state of the surface thereof being substantially uniform (for example, in a state of a surface treated layer being formed in the shape of a thin film).

Further, surface treatment of imparting hydrophobicity to the surface of silica particles by using a hydrophobic treatment agent together with the siloxane compound in the supercritical carbon dioxide may be performed.

In this case, there becomes a state in which both the hydrophobic treatment agent and the siloxane compound are dissolved in the supercritical carbon dioxide. It is considered that the siloxane compound and hydrophobic treatment agent existing in the state of being dissolved in the supercritical carbon dioxide diffuse deeply into the holes of the surface of silica particles together with supercritical carbon dioxide to easily reach the hole, and it is considered that the surface treatment with the siloxane compound and the hydrophobic treatment agent is performed deeply in the hole as well as on the surface of silica particles.

As a result, the silica particles surface-treated with the siloxane compound and the hydrophobic treatment agent in the supercritical carbon dioxide are easily adhered to the surface of silica particles with the siloxane compound are the hydrophobizing agent in a state of the surface thereof being substantially uniform, so as to impart high hydrophobicity to the surface of silica particles.

It is preferable that the specific silica particles are prepared by the following method.

As the method of preparing the specific silica particles, there is exemplified a method of preparing silica particles, including: a process of providing a silica particle dispersion containing silica particles and a solvent including alcohol and water (hereinafter, referred to as "dispersion providing process") by a sol-gel process; removing the solvent from the silica particle dispersion by circulating supercritical carbon dioxide (hereinafter, referred to as "solvent removing process"); and surface-treating the surface of the silica particle with a siloxane compound in the supercritical carbon dioxide after removing the solvent (hereinafter, referred to as "surface treatment process").

As described above, when the process of removing the solvent from the silica particle dispersion is performed using the supercritical carbon dioxide, it is easy to prevent the formation of coarse powder.

The reason for this is not clear, but is considered as follows. 1) In the case of removing the solvent from the silica particle dispersion, since the supercritical carbon dioxide has a property of "interfacial tension not operating", the solvent may be removed without the aggregation of particles by the liquid crosslinking force at the time of removing the solvent, and 2) since the supercritical carbon dioxide is "carbon dioxide existing in the state of temperature and pressure equal to or more than the critical point and has a property of having both diffusivity of gas and solubility of liquid", the silica particle dispersion effectively comes into contact with the supercritical carbon dioxide at a relatively low temperature (for example, 250° C. or lower) to allow the supercritical carbon dioxide in which the solvent is dissolved to be removed, thereby removing the solvent from the silica particle dispersion without the formation of coarse powder, such as secondary aggregates, by the condensation of silanol groups.

Here, the solvent removing process and the surface treatment process may be separately performed, but, preferably, may also be continuously performed (that is, each process is performed in a non-open state to atmospheric pressure). When these processes are continuously performed, the chance of silica particles adsorbing moisture disappears after the solvent removing process, and thus the surface treatment process may be performed in a state in which the adsorption of excess moisture to silica particles is prevented.

Therefore, it is not required to use a large amount of a siloxane compound, and it is not required to perform the solvent removing process and the surface treatment process at high temperature at which excessive heating is performed. As a result, it is easy to prevent the formation of coarse powder more effectively.

Hereinafter, the above-described dispersion providing process, solvent removing process and surface treatment process will be described in detail with respect to each process.

The method of preparing specific silica particles is not limited to a method including the above three processes, and, for example, may be 1) an aspect in which supercritical carbon dioxide is used only in the surface treatment process, or 2) an aspect in which each process is separately performed.

Dispersion Providing Process

In the dispersion providing process, for example, a silica particle dispersion containing silica particles and a solvent including alcohol and water is provided.

Specifically, in the dispersion providing process, for example, a silica particle dispersion is prepared by a wet process (for example, a sol-gel process), and this silica particle dispersion is provided. In particular, silica particles are formed by a sol-gel process as a wet process, specifically, by causing the reactions (hydrolysis reaction and condensation reaction) of tetraalkoxysilane with a solvent of alcohol and water in the presence of an alkali catalyst, and a silica particle dispersion is prepared using these silica particles.

The preferable range of average circle-equivalent diameter of silica particles and the preferable range of average circularity degree thereof have been described as above. It is preferable that silica particles (untreated silica particles) are prepared within these ranges.

In the dispersion providing process, for example, in the case where silica particles are obtained by a wet process, the silica particles are obtained in the form of a dispersion (silica particle dispersion) in which silica particles are dissolved in a solvent.

When the solvent removing process is performed, in the prepared silica particle dispersion, the weight ratio of silica particles to the silica particle dispersion, for example, may be 0.05 to 0.7, preferably 0.2 to 0.65, and more preferably 0.3 to 0.6.

When the weight ratio of silica particles to the silica particle dispersion is below 0.05, the amount of supercritical carbon dioxide used in the solvent removing process increases, and thus productivity deteriorates.

Further, when the weight ratio of silica particles to the silica particle dispersion is above 0.7, the distance between silica particles in the silica particle dispersion decreases, and thus coarse powder is easily formed due to the aggregation or gelation of silica particles.

Solvent Removing Process

The solvent removing process, for example, is a process of removing a solvent from the silica particle dispersion by circulating supercritical carbon dioxide.

That is, in the solvent removing process, supercritical carbon dioxide is brought into contact with the silica particle dispersion by circulating the supercritical carbon dioxide, so as to remove a solvent from the silica particle dispersion.

Specifically, in the solvent removing process, for example, the silica particle dispersion is put into a sealed reactor. Then, liquefied carbon dioxide is put in the sealed reactor, the sealed reactor is heated, and then the pressure in the reactor is increased by a high-pressure pump, so as to set the carbon dioxide to a supercritical state. Further, the supercritical carbon dioxide is charged into the sealed reactor and discharged from the sealed reactor, thereby circulating the supercritical carbon dioxide in the sealed reactor, that is, the silica particle dispersion.

Thus, the supercritical carbon dioxide is discharged to the outside of the silica particle dispersion (outside of the sealed reactor) while dissolving a solvent (alcohol and water), so as to remove the solvent.

The temperature condition for solvent removal, that is, the temperature of the supercritical carbon dioxide may be 31° C. to 350° C., preferably 60° C. to 300° C., and more preferably 80° C. to 250° C.

When this temperature is lower than 31° C., it is difficult to allow the solvent to be dissolved in the supercritical carbon dioxide, and thus it is difficult to remove the solvent. Further, it is considered that coarse powder is easily formed by the liquid crosslinking force of the solvent or the supercritical carbon dioxide. Meanwhile, when this temperature is higher than 350° C., it is considered that coarse powder, such as secondary aggregates, is easily formed by the condensation of silanol groups of the surface of silica particles.

The pressure condition for solvent removal, that is, the pressure of the supercritical carbon dioxide may be 7.38 MPa to 40 MPa, preferably 10 MPa to 35 MPa, and more preferably 15 MPa to 25 MPa.

When this pressure is lower than 7.38 MPa, there is a tendency that it is difficult to allow the solvent to be dissolved in the supercritical carbon dioxide. In contrast, when this pressure is higher than 40 MPa, there is a tendency that equipment cost is high.

The amount of supercritical carbon dioxide charged into the sealed reactor and discharged from the sealed reactor, for example, may be 15.4 L/min/m$^3$ to 1,540 L/min/m$^3$, and preferably 77 L/min/m$^3$ to 770 L/min/m$^3$.

When the charge amount and discharge amount thereof is less than 15.4 L/min/m$^3$, it takes time to remove a solvent, and thus there is a tendency that productivity easily deteriorates. In contrast, when the charge amount and discharge amount thereof is more than 1,540 L/min/m$^3$, supercritical carbon dioxide short-passed, so that the contact time of the silica particle dispersion becomes shorter, and thus there is a tendency that it is difficult to efficiently remove a solvent.

Surface Treatment Process

The surface treatment process, for example, is a process of surface-treating the surface of silica particles with a siloxane compound in the supercritical carbon dioxide, after the solvent removing process.

That is, in the surface treatment process, for example, after the solvent removing process, the surface of silica particles is treated with a siloxane compound in the supercritical carbon dioxide without opening to the air.

Specifically, in the surface treatment process, for example, after stopping the charge of supercritical carbon dioxide into the sealed reactor and the discharge of supercritical carbon dioxide from the sealed reactor in the solvent removing process, the temperature and pressure in the sealed reactor are adjusted, and a siloxane compound is put into the sealed reactor at a predetermined ratio to silica particles in a state in which the supercritical carbon dioxide existing in the sealed reactor. Then, the surface treatment of silica particles is performed by reacting a siloxane compound with silica particles while maintaining this state, that is, in the supercritical carbon dioxide.

Here, in the surface treatment process, the reaction of a siloxane compound may be performed in the supercritical carbon dioxide (that is, under an atmosphere of supercritical carbon dioxide), and surface treatment may be performed while circulating supercritical carbon dioxide (that is, while charging supercritical carbon dioxide into the sealed reactor and discharging the supercritical carbon dioxide from the sealed reactor) and may also be performed without circulating.

In the surface treatment process, the amount (that is, charged amount) of silica particles with respect to the volume of the reactor, for example, may be 30 g/L to 600 g/L, preferably 50 g/L to 500 g/L, and more preferably 80 g/L to 400 g/L.

When the amount thereof is less than 30 g/L, the concentration of a siloxane compound to supercritical carbon dioxide is decreased to decrease the probability of contact with silica surface, and thus reaction is less likely to proceed. In contrast, when the amount thereof is more than 600 g/L, the concentration of a siloxane compound to supercritical carbon dioxide is increased, so that the siloxane compound is not completely dissolved in the supercritical carbon dioxide to cause poor dispersion, and thus coarse aggregates are easily formed.

The density of supercritical carbon dioxide, for example, may be 0.10 g/ml to 0.80 g/ml, preferably 0.10 g/ml to 0.60 g/ml, and more preferably 0.2 g/ml to 0.50 g/ml.

When the density thereof is lower than 0.10 g/ml, the solubility of a siloxane compound to supercritical carbon dioxide is decreased, and thus there is a tendency to form aggregates. In contrast, when the density thereof is higher than 0.80 g/ml, the diffusivity of silica particles into holes is deteriorated, and thus there is a case where surface treatment becomes insufficient. Particularly, the surface treatment of sol-gel silica particles containing many silanol groups may be performed within the above density range.

The density of supercritical carbon dioxide is adjusted by temperature, pressure, and the like.

The temperature condition for surface treatment, that is, the temperature of the supercritical carbon dioxide may be 80° C. to 300° C., preferably 100° C. to 250° C., and more preferably 120° C. to 200° C.

When the temperature thereof is lower than 80° C., the surface treatment capacity by a siloxane compound is deteriorated. In contrast, when the temperature thereof is higher than 300° C., the condensation reaction between silanol group of silica particles proceeds, and thus particle aggregation occurs. Particularly, the surface treatment of sol-gel silica particles containing many silanol groups may be performed within the above temperature range.

The pressure condition for surface treatment, that is, the pressure of the supercritical carbon dioxide, for example, may be 8 MPa to 30 MPa, preferably 10 MPa to 25 MPa, and more preferably 15 MPa to 20 MPa, as long as the pressure condition is a condition satisfying the above density.

Specific examples of the siloxane compound used in the surface treatment have been described as above. Further, the preferable range of viscosity of the siloxane compound has also been described as above.

Among the above siloxane compounds, when silicone oil is applied, the silicone oil easily adheres to the surface of silica particles in an almost uniform state, and thus the fluidity, dispersibility and treatability of silica particles are easily improved.

The amount of the siloxane compound to be used, from the viewpoint of easily controlling the surface coated amount of the siloxane compound to silica particles within the range of 0.01% by weight to 5% by weight, for example, may be 0.05% by weight to 3% by weight, preferably 0.1% by weight to 2% by weight, and more preferably 0.15% by weight to 1.5% by weight, with respect to the silica particles.

The siloxane compound may be used alone, but may be used as a mixed solution in which the siloxane compound is mixed with a solvent easily dissolving the siloxane compound. Examples of the solvent include toluene, methyl ethyl ketone, and methyl isobutyl ketone.

In the surface treatment process, the surface treatment of silica particles may be performed by a mixture including a hydrophobic treatment agent together with the siloxane compound.

As the hydrophobic treatment agent, for example, a silane hydrophobic treatment agent is exemplified. As the silane hydrophobic treatment agent, a known silicon compound having an alkyl group (for example, a methyl group, an ethyl group, a propyl group, or a butyl group) is exemplified, and specific examples thereof include silazane compounds (for example, silane compounds, such as methyltrimethoxysilane, dimethyldimethoxysilane, trimethylchlorosilane, and trimethylmethoxysilane; hexamethyldisilazane; and tetramethyldisilazane). These hydrophobic treatment agents may be used alone, and may also be used in a combination of two or more thereof.

Among the silane hydrophobic treatment agents, a silicon compound having a trimethyl group, such as trimethylmethoxysilane or hexamethyldisilazane (HMDS), particularly, hexamethyldisilazane (HMDS) is preferable.

The amount of the hydrophobic treatment agent to be used is not particularly limited, but, for example, may be 1% by weight to 100% by weight, preferably 3% by weight to 80% by weight, and more preferably 5% by weight to 50% by weight, with respect to the silica particles.

The hydrophobic treatment agent may be used alone, but may be used as a mixed solution in which the silane hydrophobic treatment agent is mixed with a solvent easily dissolving the silane hydrophobic treatment agent. Examples of the solvent include toluene, methyl ethyl ketone, and methyl isobutyl ketone.

Preparation of Oil-Treated Inorganic Particles

The method of preparing oil-treated inorganic particles is not particularly limited as long as inorganic particles may be surface-treated with oil. As the method, a dry method using a spray process of spraying a solution containing oil to inorganic particles suspended in the gas phase; and a wet method of dipping inorganic particles into a solution containing oil and drying the inorganic particles are exemplified. Further, after the above treatment, excess oil may be removed by dipping the inorganic particles into an organic solvent, such as ethanol.

Preparation of Resin Particles

The resin particles may be prepared by a method of molten-kneading a resin and then pulverizing and classifying the molten-kneaded resin (kneading pulverization method), a method of suspending and dispersing an oil phase, obtained by dissolving a resin in a water-soluble organic solvent, in an aqueous phase containing a dispersant and then removing the solvent (dissolution suspension method), or a method of aggregating a resin, obtained by the emulsion polymerization of resin monomers, and then making the resin aggregates into particles (emulsion polymerization aggregation method).

In the case where the resin particles contain the above components, such as inorganic particles, each of the above components may be mixed with a resin in advance. In the case of the emulsion polymerization aggregation method, emulsion polymerization may be performed after mixing resin monomers with each of the above components.

Particle Mixing Process

The particle mixing process is a process of mixing the specific silica particles, oil-treated inorganic particles, and resin particles, which are provided in the particle providing process. Through the process, the specific silica particles are adhered to the surface of the resin particles, and the oil-treated inorganic particles are also adhered thereto in connection with the specific silica particles.

As the method of mixing the specific silica particles, oil-treated inorganic particles and resin particles, there is exemplified a method of charging the particles into a V-type blender, a HENSCHEL MIXER, or a LODIGE MIXER and then stirring these particles. All of the specific silica particles, oil-treated inorganic particles and resin particles may be mixed with each other at once, and the specific silica particles and oil-treated inorganic particles may be stepwisely mixed with the resin particles with respect to the total amount of the resin particles.

As described above, in the resin particle composition, the content of the oil-treated inorganic particles is preferably 0.1 parts by weight to 6 parts by weight with respect to 100 parts by weight of the resin particles, and the content of the specific silica particles is preferably 0.1 parts by weight to 6 parts by weight with respect to 100 parts by weight of the resin particles. It is preferable to mix the specific silica particles, oil-treated inorganic particles and resin particles within the above ranges, in terms of preventing the fixation of the resin particle composition into the pipe when transporting the resin particle composition using air.

EXAMPLES

Hereinafter, the present invention will be described in more detail with reference to Examples. However, the present invention is not limited to these Examples. Here, "parts" and "%" are based on weight, unless otherwise specified.

Preparation of Silica Particle Dispersion (1)

300 parts of methanol and 70 parts of 10% aqueous ammonia are put into a 1.5 L glass reaction container provided with a stirrer, a dropping nozzle, and a thermometer, and mixed with each other, so as to obtain an alkali catalyst solution.

The alkali catalyst solution is adjusted to 30° C., and then 185 parts of tetramethoxysilane and 50 parts of 8.0% aqueous ammonia are simultaneously dropped thereinto while stirring, so as to obtain a hydrophilic silica particle dispersion (solid concentration: 12.0% by weight). Here, dropping time is set to 30 minutes.

Thereafter, the obtained silica particle dispersion is concentrated to have a solid concentration of 40% by weight by a rotary filter R-FINE (manufactured by KOTOBUKI Industry Co., Ltd.). This concentrated product is designated as silica particle dispersion (1).

Preparation of Silica Particle Dispersions (2) to (8)

Silica particle dispersions (2) to (8) are prepared in the same manner as in the preparation of the silica particle dispersion (1), except that the alkali catalyst solution (content of methanol and content of 10% aqueous ammonia) and silica particle formation conditions (total dropping amount of tetramethoxysilane (represented by TMOS) into the alkali catalyst solution, total dropping amount of 8% aqueous ammonia into the alkali catalyst solution, and dropping time) are changed according to Table 1.

Silica particle dispersions (1) to (8) are summarized in Table 1.

TABLE 1

| Silica particle dispersion | Alkali catalyst solution | | Silica particle formation condition | | |
|---|---|---|---|---|---|
| | Methanol (parts) | 10% aqueous ammonia (parts) | Total dropping amount of TMOS (parts) | Total dropping amount of 8% aqueous ammonia (parts) | Dropping time (min) |
| (1) | 300 | 70 | 185 | 50 | 30 |
| (2) | 300 | 70 | 340 | 92 | 55 |
| (3) | 300 | 46 | 40 | 25 | 30 |
| (4) | 300 | 70 | 62 | 17 | 10 |
| (5) | 300 | 70 | 700 | 200 | 120 |
| (6) | 300 | 70 | 500 | 140 | 85 |
| (7) | 300 | 70 | 1,000 | 280 | 170 |
| (8) | 300 | 70 | 3,000 | 800 | 520 |

Preparation of Surface-Treated Silica Particles (S1)

The surface treatment of silica particles with a siloxane compound is performed under supercritical carbon dioxide atmosphere using the silica particle dispersion (1) as follows. In the surface treatment, an apparatus equipped with a carbon dioxide cylinder, a carbon dioxide pump, an entrainer pump, a stirrer-equipped autoclave (capacity: 500 ml), and a pressure valve is used.

First, 250 parts of the silica particle dispersion (1) is put into the stirrer-equipped autoclave (capacity: 500 ml), and the stirrer is rotated at 100 rpm. Then, liquefied carbon dioxide is injected into the autoclave, and the pressure in the autoclave is increased by the carbon dioxide pump while increasing the temperature in the autoclave by a heater, so as to set the inside of the autoclave to a supercritical state of 150° C. and 15 MPa. Then, methanol and water are removed from the silica particle dispersion (1) by circulating supercritical carbon dioxide using the carbon dioxide pump while maintaining the pressure in the autoclave at 15 MPa using the pressure valve (solvent removing process), so as to obtain silica particles (untreated silica particles).

Next, the circulation of supercritical carbon dioxide is stopped at the time that the circulation amount of circulated supercritical carbon dioxide (accumulated amount are measured as the circulation amount of carbon dioxide in the standard state) becomes 900 parts.

Then, in a state in which the temperature is maintained at 150° C. by the heater, the pressure is maintained at 15 MPa by the carbon dioxide pump, and the supercritical state of carbon dioxide in the autoclave is maintained, a treatment agent solution, which is obtained in advance by dissolving 0.3 parts of dimethyl silicone oil (DSO: trade name "KF-96", manufactured by Shin-Etsu Chemical Co., Ltd.) having a viscosity of 10,000 cSt, as a siloxane compound, in 20 parts of hexamethyldisilazane (HMDS, manufactured by YUKI GOSEI KOGYO CO., LTD.), as a hydrophobic treatment agent, is injected into the autoclave by the entrainer pump, and then reacted with respect to 100 parts of the above silica particles (untreated silica particles) for 20 minutes at 180° C. with stirring. Then, the supercritical carbon dioxide is circulated again, so as to remove the excess treatment agent solution. Then, stirring is stopped, the pressure in the autoclave is reduced to atmospheric pressure by opening the pressure valve, and the temperature in the autoclave is reduced to room temperature (25° C.)

As such, the solvent removing process and the surface treatment with the siloxane compound are sequentially performed, so as to obtain surface-treated silica particles (S1).

Preparation of surface-treated silica particles (S2) to (S5), (S7) to (S9), and (S12) to (S17)

Surface-treated silica particles (S2) to (S5), (S7) to (S9), and (S12) to (S17) are prepared in the same manner as in the preparation of the surface-treated silica particles (S1), except that silica particle dispersion and surface treatment condition (treatment atmosphere, siloxane compound (kind, viscosity, and addition amount), and hydrophobic treatment agent and addition amount thereof) are changed according to Table 2.

Preparation of surface-treated silica particles (S6)

The surface treatment of silica particles with a siloxane compound is performed under the air atmosphere using a dispersion which is the same as the silica particle dispersion (1) used in the preparation of the surface-treated silica particles (S1) as follows.

An ester adapter and a cooling tube are mounted in the reaction container used in the preparation of the silica particle dispersion (1), the silica particle dispersion (1) is heated to 60° C. to 70° C. to remove methanol, water is added thereto, and this dispersion is further heated to 70° C. to 90° C. to remove methanol, so as to obtain an aqueous dispersion of silica particles. 3 parts of methyl trimethoxysilane (MTMS, manufactured by Shin-Etsu Chemical Co., Ltd.) is added at room temperature with respect to 100 parts of solid content of silica particles in the aqueous dispersion, and a reaction is performed for 2 hours, so as to perform the surface treatment of silica particles. Methyl isobutyl ketone is added to the surface-treated dispersion, and then the dispersion is heated to 80° C. to 110° C. to remove methanol. Then, 80 parts of hexamethyldisilazane (HMDS, manufactured by YUKI GOSEI KOGYO CO., LTD.) and 1.0 part of dimethyl silicone oil (DSO: trade name "KF-96", manufactured by Shin-Etsu Chemical Co., Ltd.) having a viscosity of 10,000 cSt, as a siloxane compound, are added at room temperature with respect to 100 parts of solid content of silica particles in the obtained dispersion, followed by a reaction at 120° C. for 3 hours, cooling, and drying by spray drying, so as to obtain surface-treated silica particles (S6).

Preparation of Surface-Treated Silica Particles (S10)

Surface-treated silica particles (S10) are prepared in the same manner as in the preparation of the surface-treated silica particles (S1), except that fumed silica ("AEROSILOX50", manufactured by Nippon Aerosil Co., Ltd.) is used instead of the silica particles (untreated silica particles) obtained by removing methanol and water from the silica particle dispersion (1).

That is, 100 parts of AEROSIL OX50 is put into the stirrer-equipped autoclave, which is the same as that used in the preparation of the surface-treated silica particles (S1), and the stirrer is rotated at 100 rpm. Then, liquefied carbon dioxide is injected into the autoclave, and the pressure in the autoclave is increased by the carbon dioxide pump while increasing the temperature in the autoclave by a heater, so as to set the inside of the autoclave to a supercritical state of 180° C. and 15 MPa. Then, in a state in which the pressure in the autoclave is maintained at 15 MPa by the pressure valve, a treatment agent solution, which is obtained in advance by dissolving 0.3 parts of dimethyl silicone oil (DSO: trade name "KF-96", manufactured by Shin-Etsu Chemical Co., Ltd.) having a viscosity of 10,000 cSt, as a siloxane compound, in 20 parts of hexamethyldisilazane (HMDS, manufactured by YUKI GOSEI KOGYO CO., LTD.), as a hydrophobic treatment agent, is injected into the autoclave by the entrainer pump, followed by a reaction with respect to 100 parts of the above silica particles (untreated silica particles) for 20 minutes at 180° C. with stirring. Then, the supercritical carbon dioxide is circulated to remove excess treatment agent solution, so as to obtain surface-treated silica particles (S10).

Preparation of Surface-Treated Silica Particles (S11)

Surface-treated silica particles (S11) are prepared in the same manner as in the preparation of the surface-treated silica particles (S1), except that fumed silica ("AEROSIL A50", manufactured by Nippon Aerosil Co., Ltd.) is used instead of the silica particles (untreated silica particles) obtained by removing methanol and water from the silica particle dispersion (1).

That is, 100 parts of AEROSIL A50 is put into the stirrer-equipped autoclave, which is the same as that used in the preparation of the surface-treated silica particles (S1), and the stirrer is rotated at 100 rpm. Then, liquefied carbon dioxide is injected into the autoclave, and the pressure in the autoclave is increased by the carbon dioxide pump while increasing the temperature in the autoclave by a heater, so as to set the inside of the autoclave to a supercritical state of 180° C. and 15 MPa. Then, in a state in which the pressure in the autoclave is maintained at 15 MPa by the pressure valve, a treatment agent solution, which is obtained in advance by dissolving 1.0 part of dimethyl silicone oil (DSO: trade name "KF-96", manufactured by Shin-Etsu Chemical Co., Ltd.) having a viscosity of 10,000 cSt, as a siloxane compound, in 40 parts of hexamethyldisilazane (HMDS, manufactured by YUKI GOSEI KOGYO CO., LTD.), as a hydrophobic treatment agent, is injected into the autoclave by the entrainer pump, followed by a reaction with respect to 100 parts of the above silica particles (untreated silica particles) for 20 minutes at 180° C. with stirring. Then, the supercritical carbon dioxide is circulated to remove excess treatment agent solution, so as to obtain surface-treated silica particles (S11).

Preparation of Surface-Treated Silica Particles (SC1)

Surface-treated silica particles (SC1) are prepared in the same manner as in the preparation of the surface-treated silica particles (S1), except that a siloxane compound is not added.

Preparation of Surface-Treated Silica Particles (SC2) to (SC4)

Surface-treated silica particles (SC2) to (SC4) are prepared in the same manner as in the preparation of the surface-treated silica particles (S1), except that silica particle dispersion and surface treatment condition (treatment atmosphere, siloxane compound (kind, viscosity, and addition amount), and hydrophobic treatment agent and addition amount thereof) are changed according to Table 3.

Preparation of Surface-Treated Silica Particles (SC5)

Surface-treated silica particles (SC5) are prepared in the same manner as in the preparation of the surface-treated silica particles (S6), except that a siloxane compound is not added.

Preparation of Surface-Treated Silica Particles (SC6)

The silica particle dispersion (8) is filtered, the resultant residue is dried at 120° C. and put into an electrical furnace, and then sintered at 400° C. for 6 hours. Then, 10 parts of HMDS is added to 100 parts of silica particles, followed by spray drying, so as to obtain surface-treated silica particles (SC6).

The average circle-equivalent diameter, average circularity degree, amount of siloxane compound adhered to untreated silica particles, compression aggregation degree, particle compression ratio, and particle dispersion degree of the surface-treated silica particles obtained in each example are measured by the above-described method.

TABLE 2

| Surface-treated silica particle | Silica particle dispersion | Surface treatment condition | | | | | Characteristics of surface-treated silica particles | | | | |
|---|---|---|---|---|---|---|---|---|---|---|---|
| | | Siloxane compound | | | | | Average | | | | Particle |
| | | Kind | Viscosity (cSt) | Addition amount (parts) | Treatment atmosphere | Hydrophobic treatment agent/parts | circle equivalent diameter (nm) | Average circularity degree | Surface coated amount (wt %) | Compression aggregation degree (%) | Particle compression ratio | Particle dispersion degree (%) |
| (S1) | (1) | DSO | 10,000 | 0.3 | Supercritical $CO_2$ | HMDS/20 parts | 120 | 0.958 | 0.28 | 85 | 0.310 | 98 |
| (S2) | (1) | DSO | 10,000 | 1.0 | Supercritical $CO_2$ | HMDS/20 parts | 120 | 0.958 | 0.98 | 92 | 0.280 | 97 |
| (S3) | (1) | DSO | 5,000 | 0.15 | Supercritical $CO_2$ | HMDS/20 parts | 120 | 0.958 | 0.12 | 80 | 0.320 | 99 |
| (S4) | (1) | DSO | 5,000 | 0.5 | Supercritical $CO_2$ | HMDS/20 parts | 120 | 0.958 | 0.47 | 88 | 0.295 | 98 |
| (S5) | (2) | DSO | 10,000 | 0.2 | Supercritical $CO_2$ | HMDS/20 parts | 140 | 0.962 | 0.19 | 81 | 0.360 | 99 |
| (S6) | (1) | DSO | 10,000 | 1.0 | Atmosphere | HMDS/80 parts | 120 | 0.958 | 0.50 | 83 | 0.380 | 93 |
| (S7) | (3) | DSO | 10,000 | 0.3 | Supercritical $CO_2$ | HMDS/20 parts | 130 | 0.850 | 0.29 | 68 | 0.350 | 92 |
| (S8) | (4) | DSO | 10,000 | 0.3 | Supercritical $CO_2$ | HMDS/20 parts | 90 | 0.935 | 0.29 | 94 | 0.390 | 95 |
| (S9) | (1) | DSO | 50,000 | 1.5 | Supercritical $CO_2$ | HMDS/20 parts | 120 | 0.958 | 1.25 | 95 | 0.240 | 91 |

TABLE 2-continued

|  | Surface treatment condition | | | | | | Characteristics of surface-treated silica particles | | | | | |
|---|---|---|---|---|---|---|---|---|---|---|---|---|
|  |  | Siloxane compound | | | |  |  | Average | | | | Particle |
| Surface-treated silica particle | Silica particle dispersion | Kind | Viscosity (cSt) | Addition amount (parts) | Treatment atmosphere | Hydrophobic treatment agent/parts | Average circle equivalent diameter (nm) | Average circularity degree | Surface coated amount (wt %) | Compression aggregation degree (%) | Particle compression ratio | dispersion degree (%) |
| (S10) | Fumed silica OX50 | DSO | 10,000 | 0.3 | Supercritical CO$_2$ | HMDS/20 parts | 80 | 0.680 | 0.26 | 84 | 0.395 | 92 |
| (S11) | Fumed silica A50 | DSO | 10,000 | 1.0 | Supercritical CO$_2$ | HMDS/40 parts | 45 | 0.740 | 0.91 | 88 | 0.396 | 91 |
| (S12) | (3) | DSO | 5,000 | 0.04 | Supercritical CO$_2$ | HMDS/20 parts | 130 | 0.850 | 0.02 | 62 | 0.360 | 96 |
| (S13) | (3) | DSO | 1,000 | 0.5 | Supercritical CO$_2$ | HMDS/20 parts | 130 | 0.850 | 0.46 | 90 | 0.380 | 92 |
| (S14) | (3) | DSO | 10,000 | 5.0 | Supercritical CO$_2$ | HMDS/20 parts | 130 | 0.850 | 4.70 | 95 | 0.360 | 91 |
| (S15) | (5) | DSO | 10,000 | 0.5 | Supercritical CO$_2$ | HMDS/20 parts | 185 | 0.971 | 0.43 | 61 | 0.209 | 96 |
| (S16) | (6) | DSO | 10,000 | 0.5 | Supercritical CO$_2$ | HMDS/20 parts | 164 | 0.970 | 0.41 | 64 | 0.224 | 97 |
| (S17) | (7) | DSO | 10,000 | 0.5 | Supercritical CO$_2$ | HMDS/20 parts | 210 | 0.978 | 0.44 | 60 | 0.205 | 98 |

TABLE 3

|  | Surface treatment condition | | | | | | Characteristics of surface-treated silica particles | | | | | |
|---|---|---|---|---|---|---|---|---|---|---|---|---|
|  |  | Siloxane compound | | | |  |  | Average | | | | |
| Surface-treated silica particle | Silica particle dispersion | Kind | Viscosity (cSt) | Addition amount (parts) | Treatment atmosphere | Hydrophobizing agent/parts | Average circle equivalent diameter (nm) | Average circularity degree | Surface coated amount (wt %) | Compression aggregation degree (%) | Particle compression ratio | Particle dispersion degree (%) |
| (SC1) | (1) | — | — | — | Supercritical CO$_2$ | HMDS/20 parts | 120 | 0.958 | — | 55 | 0.415 | 99 |
| (SC2) | (1) | DSO | 100 | 3.0 | Supercritical CO$_2$ | HMDS/20 parts | 120 | 0.958 | 2.5 | 98 | 0.450 | 75 |
| (SC3) | (1) | DSO | 1,000 | 8.0 | Supercritical CO$_2$ | HMDS/20 parts | 120 | 0.958 | 7.0 | 99 | 0.360 | 83 |
| (SC4) | (3) | DSO | 3,000 | 10.0 | Supercritical CO$_2$ | HMDS/20 parts | 130 | 0.850 | 8.5 | 99 | 0.380 | 85 |
| (SC5) | (1) | — | — | — | Atmosphere | HMDS/80 parts | 120 | 0.958 | — | 62 | 0.425 | 98 |
| (SC6) | (8) | — | — | — | Atmosphere | HMDS/10 parts | 300 | 0.980 | — | 60 | 0.197 | 93 |

Preparation of Resin Particles (A)

23 mol % of dimethyl terephthalate, 10 mol % of isophthalic acid, 15 mol % of dodecenyl succinic anhydride, 3 mol % of trimellitic anhydride, 5 mol % of an adduct of 2 mol ethylene oxide to bisphenol A, and 45 mol % of an adduct of 2 mol propylene oxide of bisphenol A are put into a reaction container equipped with a stirrer, a thermometer, a condenser, and a nitrogen gas inlet pipe, the reaction container is purged with dry nitrogen gas, 0.06 mol % of dibutyl tin oxide, as a catalyst, is added thereto, followed by a stirring reaction at about 190° C. for about 7 hours under a nitrogen gas stream. Then, temperature increases to about 250° C., and then a stirring reaction is further performed for about 5.0 hours. Then, the pressure in the reaction container is reduced to 10.0 mmHg, followed by a stirring reaction for about 0.5 hours under reduced pressure, so as to obtain a polyester resin having a polar group in a molecule thereof.

Next, 100 parts of the polyester resin is molten-kneaded by a Banbury mixer type kneader. The kneaded product is molded in the form of a plate having a thickness of about 1 cm by rolling roll, coarsely pulverized to several millimeters by a Fitz mill type pulverizer, finely pulverized by an IDS type pulverizer, and then sequentially classified by an elbow type classifier, so as to obtain resin particles (A) having a volume average particle diameter of 7 μm.

Preparation of Resin Particles (B) and (C)

In the preparation of the resin particles (A), classifications are sequentially performed by the elbow type classifier, so as to obtain resin particles (B) having a volume average particle diameter of 1 μm and resin particles (C) having a volume average particle diameter of 15 μm.

Preparation of Resin Particles (D)

Resin particles (D) having a volume average particle diameter of 8 μm are obtained by performing classification in the same manner as in the preparation of the resin particles (A), except that a styrene-butylacrylate copolymer (copolymerization ratio (weight ratio)=80:20, weight average molecular weight Mw=130,000, glass transition temperature Tg=59° C.) is used instead of the polyester resin in the preparation of resin particle (A).

Preparation of Oil-Treated Inorganic Particles (a)

30 parts by weight of dimethyl silicone oil ("KF-96-100 cs", manufactured by Shin-Etsu Chemical Co., Ltd., viscosity: 100 cSt at 25° C.) is mixed with 50 parts by weight of ethanol to prepare a solution, the solution is sprayed to 100 parts by weight of commercially available fumed silica ("OX50", manufactured by Nippon Aerosil Co., Ltd.) obtained by a gas-phase process, so as to perform the surface treatment of silica particles. Ethanol is dried and removed at 80° C., followed by silicon oil treatment with stirring for 5 hours at 250° C. The silicon oil-treated silica is dissolved in ethanol again (ethanol treatment) to separate free oil. Then, drying is performed, so as to obtain oil-treated inorganic particles (a).

The average circle-equivalent diameter of the oil-treated inorganic particles (a) is 50 nm. The amount of free oil is 3.1% by weight. The particle aggregation degree of the oil-treated inorganic particles (a) is 91%, and the particle compression ratio thereof is 0.43.

Preparation of Oil-Treated Inorganic Particles (b)

SiCl$_4$, hydrogen gas, and oxygen gas are mixed in a mixing chamber of a combustion burner, and then burned at 1,000° C. to 3,000° C. Silica powder is obtained from the gas after burning, so as to obtain silica particles. At this time, the silica particles are obtained by setting the molar ratio of hydrogen gas and oxygen gas to 1.5:1.100 parts of these silica particles and 500 parts of ethanol are put into an evaporator, followed by stirring for 15 minutes while maintaining temperature at 40° C. Next, 6 parts of dimethyl silicone oil ("KF-96-1000 cs", manufactured by Shin-Etsu Chemical Co., Ltd., viscosity: 1,000 cSt at 25° C.) is added with respect to 100 parts of silica particles, followed by stirring for 15 minutes, and 6 parts of dimethyl silicone oil is further added with respect to 100 parts of silica particles, followed by stirring for 15 minutes. Finally, temperature is increased to 90° C., ethanol is removed under reduced pressure to perform drying, and then the treated product is taken out, and further dried in vacuum at 120° C. for 30 minutes, so as to obtain oil-treated inorganic particles (b).

The average circle-equivalent diameter of the oil-treated inorganic particles (b) is 30 nm. The amount of free oil is 4.2% by weight. The particle aggregation degree of the oil-treated inorganic particles (b) is 92%, and the particle compression ratio thereof is 0.42.

Preparation of Oil-Treated Inorganic Particles (c)

15 parts by weight of electrical insulating oil ("dialer oil B", manufactured by Showa Shell Sekiyu KK, viscosity: 30 cSt at 25° C.) is sprayed by spray drying to 100 parts by weight of commercially available fumed silica ("OX50", manufactured by Nippon Aerosil Co., Ltd.) obtained by a gas-phase process, so as to perform the surface treatment of silica particles. Then, oil treatment is performed with stirring for 5 hours at 200° C., so as to obtain oil-treated inorganic particles (c).

The average circle-equivalent diameter of the oil-treated inorganic particles (c) is 45 nm. The amount of free oil is 7.0% by weight. The particle aggregation degree of the oil-treated inorganic particles (c) is 94%, and the particle compression ratio thereof is 0.45.

Preparation of Oil-Treated Inorganic Particles (d)

Oil-treated inorganic particles (d) are obtained in the same manner as in the preparation of the oil-treated inorganic particles (c), except that anatase-type titanium oxide ("TAF1500", manufactured by Fuji Titanium Industry Co., Ltd.) is used instead of the commercially available fumed silica.

The average circle-equivalent diameter of the oil-treated inorganic particles (d) is 60 nm. The amount of free oil is 4.2% by weight. The particle aggregation degree of the oil-treated inorganic particles (d) is 91%, and the particle compression ratio thereof is 0.44.

Example 1

100 parts of resin particles (A), 1 part of oil-treated inorganic particles (a), and 2 parts of surface-treated silica particles (S1), which are obtained by the above preparation methods, are added. Then, these particles are mixed with each other by a 1000 L HENSCHEL MIXER at 900 rpm for 10 minutes, and then sieved by a mesh net of 45 μm, so as to obtain a resin particle composition of Example 1.

Examples 2 to 25 and Comparative Examples 1 to 7

Resin particle compositions of Examples 2 to 25 and Comparative Examples 1 to 7 are obtained in the same manner as in Example 1, except that the kind and amount of surface-treated silica, the kind of resin particles, and the kind and amount of oil-treated inorganic particles are changed according to Tables 4 and 5. In Comparative Example 7, the resin particle composition is obtained by using commercially available fumed silica ("R972" treated with dimethyldichlorosilane, manufactured by Aerosil Co., Ltd.) instead of the oil-treated inorganic particles.

Evaluation of Resin Particle Composition

The dispersibility, detachability, and amount attached to the pipe with respect to each of the resin particle compositions obtained in Examples 1 to 25 and Comparative Examples 1 to 7 are evaluated by the following method. The results thereof are summarized in Tables 4 and 5.

Evaluation of Dispersibility

With respect to each of the resin particle compositions, the surface of the resin particle composition is observed by SEM, and the dispersibility thereof is evaluated based on the following criteria.

Evaluation Criteria (Dispersibility)

A: aggregates of specific silica particles and oil-treated inorganic particles do not exist.

B: the number of aggregates of specific silica particles and oil-treated inorganic particles is 10 or less.

C: the number of aggregates of specific silica particles and oil-treated inorganic particles is more than 10 and 20 or less.

D: the number of aggregates of specific silica particles and oil-treated inorganic particles is more than 20.

Evaluation of Detachability

The detachability (maintenance of anti-detachability) of specific silica particles and oil-treated inorganic particles after applying a mechanical load to the resin particle composition is evaluated. Specifically, the detachability thereof is evaluated as follows.

5 g of the resin particle composition and 200 g of iron powder of 100 μm are put into a glass bottle, and mixed for 60 minutes by a Dabura shaker. Then, the amount of the specific silica particles and oil-treated inorganic particles transferred to the iron powder is analyzed by X-ray fluorescence, and the detachability thereof is evaluated based on the following criteria.

Evaluation Criteria (Detachability)

A: the amount of silica and inorganic particles transferred to iron powder from the resin particle composition is less than 5% by weight.

B: the amount of silica and inorganic particles transferred to iron powder from the resin particle composition is 5% by weight or more and less than 10% by weight.

C: the amount of silica and inorganic particles transferred to iron powder from the resin particle composition is 10% by weight or more.

Evaluation of Amount Attached to Pipe

A SUS 304-made test pipe having an inner diameter φ of 47.8 mm, a length of 10 m, and an elbow portion of R90° located at 5 m from an inlet is prepared, and the resin particle composition is transported by air from an outlet through a filter using a blower as a powder suction test. At that time, 100 kg of the resin particle composition is transported by air under conditions of an in-pipe linear speed of 5.0 m/min and a solid-gas ratio of 0.5 and collected. This collected resin particle composition is repeatedly transported by air nine times in the same manner through the same pipe, and the amount attached to the pipe is evaluated by the resin weight before and after air transportation, based on the following criteria.

In the case where the pipe is clogged during the test, the evaluation is stopped.

Evaluation Criteria (Amount Attached to the Pipe)

A: amount attached to the pipe is less than 0.5%.

B: amount attached to the pipe is 0.5% or more and less than 1.0%.

C: amount attached to the pipe is 1.0% or more and less than 2.0%.

D: amount attached to the pipe is 2.0% or more and less than 3.0%.

E: amount attached to the pipe is 3.0% or more.

TABLE 4

| | Resin particle No. | Surface-treated silica particle No. | Parts | Oil-treated inorganic particle No. | Parts | Evaluation Dispersibility to resin particle | Detachability | Attachability to pipe Amount attached to pipe (wt %) | determination |
|---|---|---|---|---|---|---|---|---|---|
| Example 1 | A | (S1) | 2 | (a) | 1 | A | A | 0.12 | A |
| Example 2 | A | (S2) | 2 | (a) | 1 | A | A | 0.26 | A |
| Example 3 | A | (S3) | 2 | (a) | 1 | A | A | 0.31 | A |
| Example 4 | A | (S4) | 2 | (a) | 1 | A | A | 0.17 | A |
| Example 5 | A | (S5) | 2 | (a) | 1 | A | A | 0.29 | A |
| Example 6 | A | (S6) | 2 | (a) | 1 | A | A | 0.53 | B |
| Example 7 | A | (S7) | 2 | (a) | 1 | A | A | 0.61 | B |
| Example 8 | A | (S8) | 2 | (a) | 1 | B | B | 1.22 | C |
| Example 9 | A | (S9) | 2 | (a) | 1 | A | A | 0.77 | B |
| Example 10 | A | (S10) | 2 | (a) | 1 | B | B | 1.52 | C |
| Example 11 | A | (S11) | 2 | (a) | 1 | B | B | 1.33 | C |
| Example 12 | A | (S12) | 2 | (a) | 1 | B | B | 1.64 | C |
| Example 13 | A | (S13) | 2 | (a) | 1 | A | A | 0.72 | B |
| Example 14 | A | (S14) | 2 | (a) | 1 | A | A | 0.38 | A |
| Example 15 | A | (S15) | 2 | (a) | 1 | C | B | 2.54 | D |
| Example 16 | A | (S16) | 2 | (a) | 1 | C | B | 2.39 | D |
| Example 17 | A | (S17) | 2 | (a) | 1 | C | B | 2.13 | D |
| Example 18 | B | (S1) | 2 | (a) | 1 | A | A | 0.46 | A |
| Example 19 | C | (S1) | 2 | (a) | 1 | A | A | 0.37 | A |
| Example 20 | D | (S1) | 2 | (a) | 1 | A | A | 0.23 | A |
| Example 21 | A | (S1) | 2 | (b) | 1 | A | A | 0.82 | B |
| Example 22 | A | (S1) | 2 | (c) | 1 | A | A | 0.66 | B |
| Example 23 | A | (S1) | 2 | (d) | 1 | B | B | 1.71 | C |
| Example 24 | A | (S1) | 0.1 | (a) | 0.1 | A | B | 1.14 | C |
| Example 25 | A | (S1) | 6 | (a) | 6 | B | C | 1.17 | C |

TABLE 5

| | Resin particle No. | Surface-treated silica particle No. | Parts | Oil-treated inorganic particle No | Parts | Evaluation Dispersibility to resin particle | Detachability | Attachability to pipe Amount attached to pipe (wt %) | determination |
|---|---|---|---|---|---|---|---|---|---|
| Comparative Example 1 | A | (SC1) | 2 | (a) | 1 | C | C | — | Clogging occurred at fifth time |
| Comparative Example 2 | A | (SC2) | 2 | (a) | 1 | D | B | — | Clogging occurred at seventh time |
| Comparative Example 3 | A | (SC3) | 2 | (a) | 1 | D | B | — | Clogging occurred at ninth time |
| Comparative Example 4 | A | (SC4) | 2 | (a) | 1 | D | B | — | Clogging occurred at fourth time |
| Comparative Example 5 | A | (SC5) | 2 | (a) | 1 | D | C | — | Clogging occurred at ninth time |
| Comparative Example 6 | A | (SC6) | 2 | (a) | 1 | D | C | — | Clogging occurred at fifth time |
| Comparative Example 7 | A | (S1) | 2 | R972 | 1 | D | B | 4.68 | E |

From the above results, it is found that Examples obtain good results in the evaluation of dispersibility, detachability, and amount attached to the pipe, compared to Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin particle composition, comprising:
   resin particles;
   inorganic particles surface-treated with oil; and
   silica particles having a compression aggregation degree of 60% to 95% and a particle compression ratio of 0.20 to 0.40.

2. The resin particle composition according to claim 1, wherein an average circle-equivalent diameter of the silica particles is from 40 nm to 200 nm.

3. The resin particle composition according to claim 1, wherein a particle dispersion degree of the silica particles is from 90% to 100%.

4. The resin particle composition according to claim 1, wherein an average circularity degree of the silica particles is from 0.85 to 0.98.

5. The resin particle composition according to claim 1, wherein the silica particles are sol-gel silica particles.

6. The resin particle composition according to claim 1, wherein the silica particles are surface-treated with a siloxane compound having a viscosity of 1,000 cSt to 50,000 cSt at 25° C., and a surface coated amount of the siloxane compound is 0.01% by weight to 5% by weight.

7. The resin particle composition according to claim 6, wherein the siloxane compound is silicone oil.

8. The resin particle composition according to claim 1, wherein the inorganic particles are silica particles.

9. The resin particle composition according to claim 1, wherein the oil is silicone oil.

10. The resin particle composition according to claim 1, wherein a viscosity of the oil is from 1 cSt to 1,000 cSt at 25° C.

* * * * *